United States Patent [19]

Sumida et al.

[11] Patent Number: 5,454,496
[45] Date of Patent: Oct. 3, 1995

[54] SHIFTABLE LOAD CARRIER AND TRAILER HITCH ATTACHMENT

[76] Inventors: George S. Sumida, Jr., 707 Birmingham Rd., Burbank, Calif. 91504; Victor De Los Santos, 533 Mountain Crest Rd., Duarte, Calif. 91010

[21] Appl. No.: 31,998

[22] Filed: Mar. 16, 1993

[51] Int. Cl.[6] ........................................ B60R 9/10
[52] U.S. Cl. ................. 224/509; 224/510; 224/521; 224/531; 224/532; 224/924; 224/917.5
[58] Field of Search ................ 224/42.03 B, 42.03 R, 224/42.03 A, 42.05, 42.06, 42.07, 42.08, 42.45 R

[56] References Cited

U.S. PATENT DOCUMENTS

| | | | |
|---|---|---|---|
| 4,380,344 | 4/1983 | Abbott | 224/42.03 B X |
| 4,561,575 | 12/1985 | Jones | 224/42.06 X |
| 5,094,373 | 3/1992 | Lovci | 224/42.08 |
| 5,169,042 | 12/1992 | Ching | 224/42.45 R |
| 5,215,232 | 6/1993 | Wyers | 224/42.03 B X |

*Primary Examiner*—Renee S. Luebke

[57] ABSTRACT

A load carrier for supporting bicycles and the like, coextensively obstructing the rear opening of a vehicle such as a van, wagon or sedan, capable of simultaneous trailer hitch operation and shiftable to retract the load from the obstruction position to a retracted clearance position at the safe side of the vehicle.

13 Claims, 2 Drawing Sheets

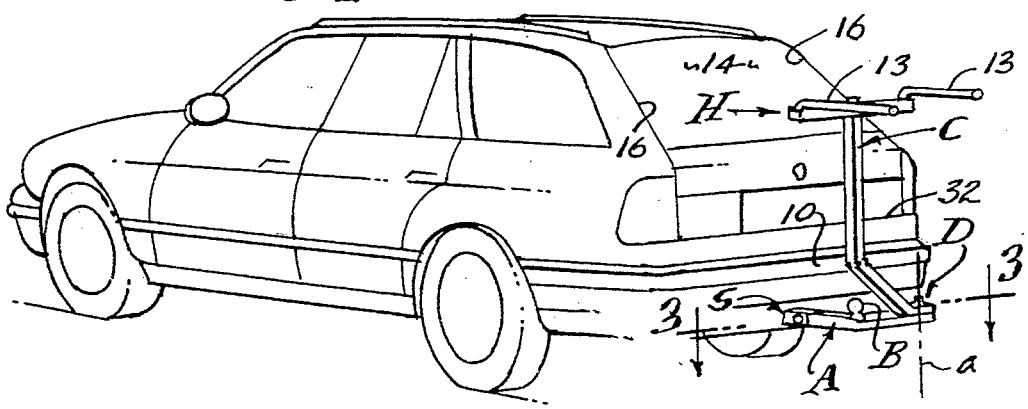
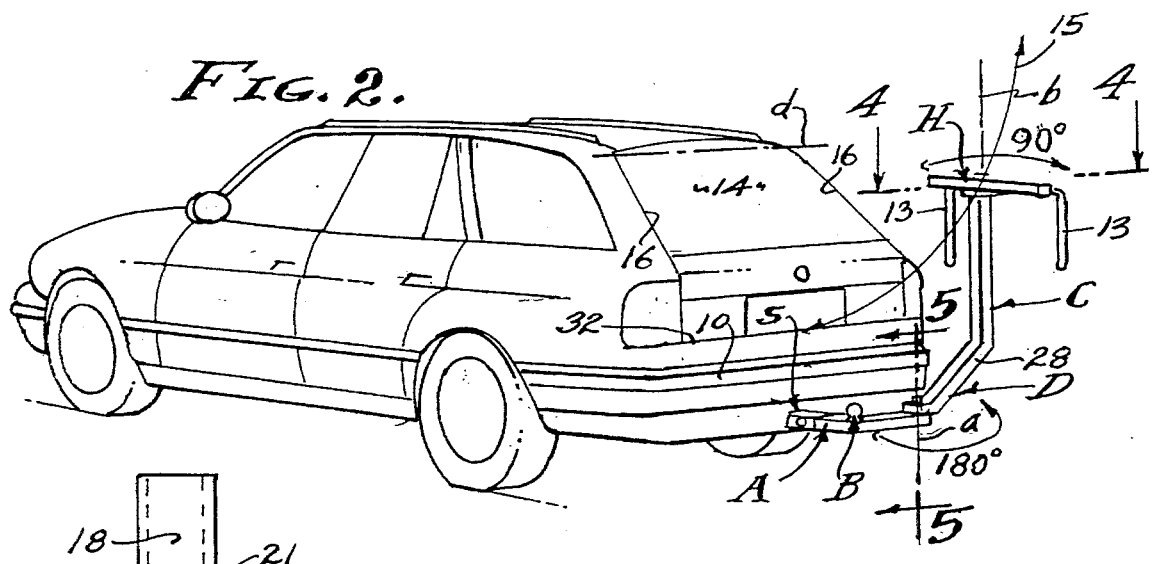
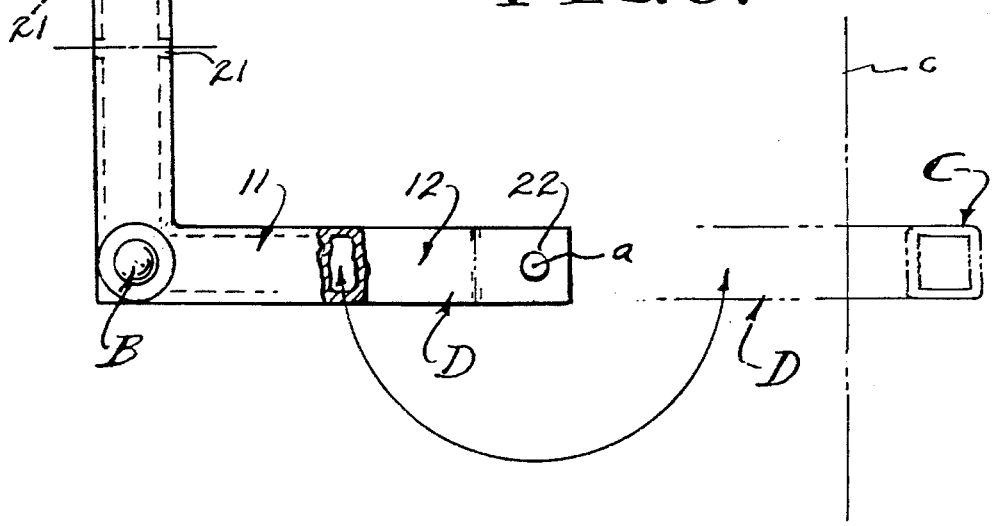

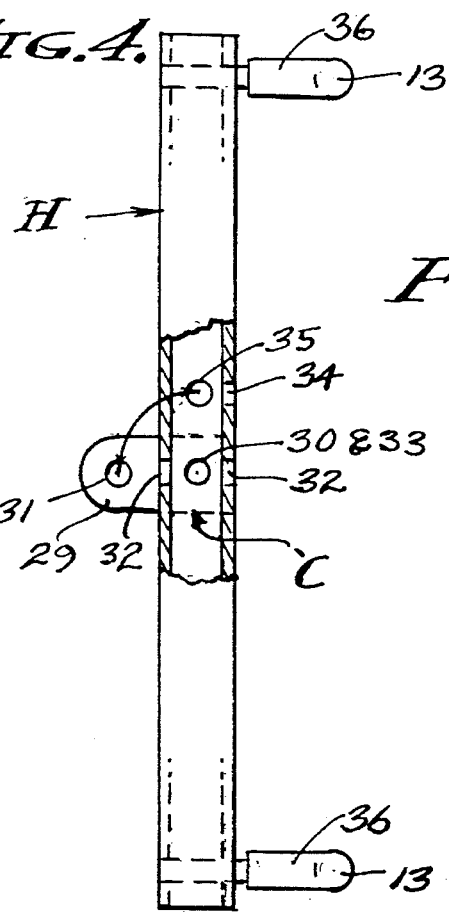
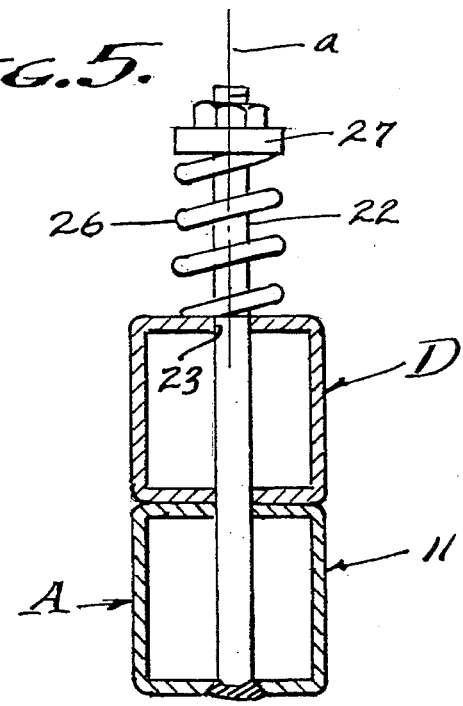
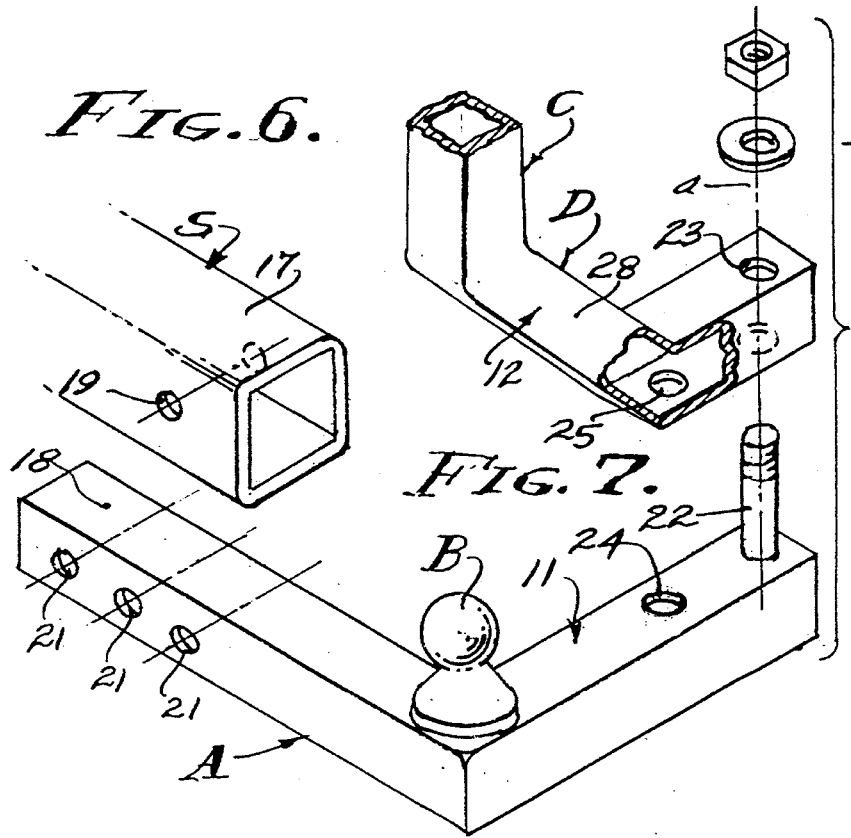

5,454,496

1

SHIFTABLE LOAD CARRIER AND TRAILER HITCH ATTACHMENT

BACKGROUND OF THE INVENTION

This invention relates to vehicles and especially to those which have rear access, it being a general object of this invention to provide a trailer hitch attachment that is a carrier for bicycles or skis and the like, without imparing access into the rear of the vehicle.

Heretofore, attachments of the type under consideration have either encumbered the rear of the vehicle so as to prevent access through the rear doors, hatch-back or trunk lid, or they have been overly complex and bulky in order to shift the load out of the way for access. In the first example of encumbering the vehicle rear, the carriers have been fixedly positioned and the load strapped thereto closely adjacent the rear doors, hatch-back or trunk lid, covering the entire rear of the vehicle. In the second example of shiftable carriers, they have required custom installation which is not only expensive but damaging to the original structural integrity and aesthetics of the vehicle coach work. Furthermore, the prior art shiftable carriers do not compensate for the bulky nature of the load; for example two or more bicycles or lengthy skis. And, neither of these two general types of carrier provides a trailer hitch and access thereto as well. Accordingly, it is an object of this invention to provide a universally applicable carrier-hitch apparatus for installation at the rear of a vehicle, whereby the load, such as bicycles or skis, is shiftable away from the access area into the vehicle interior, whether the vehicle is of the van-type with vertically hinged doors or of the wagon-type with a horizontally hinged hatch, or of the sedan-type with a notch-back and upwardly swinging lid. A feature of this invention is shifting of the carrier to the right side of the vehicle for safety, completely clear of the vehicle rear area. That is, the doors or hatch or lid are completely cleared for access, all without removal of the load from the carrier, whereby rear entry into the vehicle interior is facilitated.

The carrier herein disclosed is combined with a trailer hitch installation of the vehicle and relies entirely thereon for support, it being an object of this invention to avoid attachment to the vehicle coach work, to avoid custom installation and to avoid damage to the vehicle body. In practice, state of the art trailer hitches provide a permanent socket member at the rear bumper, to receive a ball joint adapter that is removed when not in use. It is this adapter that is replaced by the adapter-carrier base of the present invention to mount the trailer hitch ball and load carrier as well.

This load carrier is characterized by a vertical column member and a header member, which together with the aforesaid adapter member provide a knock-down assembly for compact packaging and storage, and functional operation as is required. Therefore; it is an object to provide an adapter member that is clear of the vehicle access area for supporting both the trailer hitch ball and load carrier per se; it being an object to provide a column member for extending load support to an elevated level; and it is an object to provide a header member for columnar support and that is convertible to either of two modes and suitable for horizontal plane or vertical plane load mounting.

There is a clearance plane that presents itself at either side of the vehicle body. Generally, this clearance plane occurs at each rear fender area and is disposed vertically in a fore and aft direction. In the situation here under consideration this plane extends rearward of the vehicle fender or bumper; and in the van-type vehicle is immediately outside the vertical hinge or jamb line of the door; and in the hatch-back type and sedan type vehicle is immediatley outside the vertical jamb line of the hatch or lid. It is to be understood that the hinge and jamb lines will vary in design and position dependent upon vehicle body style. However, it is this clearance plane (c) with which this invention is primarily concerned and which occurs at and inboard of the fender-to-body joinder, as shown in the drawings. It is an object therefore to provide column shifting means to shift the column member between a carrying position and a clearing position (compare FIGS. 1 and 2 ). As shown, the shifting means involves an adapter arm and a column arm which are articulated to swing on an axis (a).

Another clearance requirement provided by this invention is for the trailer hitch ball, and this is clearly shown as an offset in the column arm, characteristically over said ball and below the threshold of the vehicle door, hatch or lid is the case may be.

The header member and column member are selectively and adjustably assembled as shown, and they are secured in working position by fastener means which can vary as circumstances require. However, very simple and practical means therefor are shown, whereby the column and header members are positively and releasalby held in working position.

SUMMARY OF THE INVENTION

The shiftable load carrier and trailer hitch attachment of the present invention is applicable to any vehicle provided with a trailer hitch socket member, even though vehicles vary in design or with variations in the height of the chassis above the road level. The socket member is standardized for passenger cars and like recreational vehicles. The structural anchorage of the socket member to the vehicle chassis varies in vehicles of different manufacture, but each is characterized by a central rearwardly opening tube that presents a horizontally disposed rearwardly opening socket member S. The structural attachment to the vehicle is not shown herein, since it is customized to each vehicle model, and only the protrusion of said socket member as it passes beneath the vehicle bumper 10 is shown.

This carrier and hitch attachment is characterized by an adapter A that is releasably received by the socket member S, and which carries the trailer hitch ball B and an adapter arm 11 of a shifting means D. There is a column member C and integral arm 12 pivotally coupled to said adapter arm 11, whereby the column swings between two extreme positions; a first operating position as shown in FIG. 1 and a second clearance position as shown in FIG. 2. The working position of FIG. 1 is maintained by the pivot and pin arrangement of FIG. 7.

A feature of this invention is the header member H that is rotatable on the column C to be positioned transversely of the vehicle rear as shown in FIG. 1, or to be positioned longitudinally at the side of the vehicle as shown in FIG. 2. Note that the column C swings 180° when shifting from the working position of FIG. 1 to the clearance position of FIG. 2, and that the header H is turned 90° on the column from its FIG. 1 working position, by release of the pivot and pin arrangement shown in FIGS. 4 and 8.

Another feature of this invention is the selective loading provided by positioning the support rack members 13 as shown in either FIGS. 1 or 2, the header H being rotatable at the top of the column C by means of the pivot openings and locating pin and openings as shown in FIGS. 4 and 8.

The pivot pin of either FIGS. 7 or 8 can rotatably receive the arm 12 or header H by gravity, said arm and header being rotatably positioned by the locating pins in each instance. And alternately, the arm 12 and header H can be spring biased into and releasable from the working position as shown in FIG. 5.

The foregoing and other various objects and features of this invention will be apparent and fully understood from the following detailed description of the typical preferred form and application thereof, throughout which description reference is made to the accompanying drawings.

THE DRAWINGS

FIG. 1 is a perspective view of a typical vehicle having a rear opening door or hatch behind which the shiftable load carrier and trailer attachment of the present invention is installed on the existant trailer hitch, the carrier being shown in an operative condition.

FIG. 2 is a view similar to FIG. 1 showing the carrier in a clearance condition, whereby the door or hatch of the vehicle can be opened.

FIG. 3 is an enlarged detailed plan view of the carrier removed from the trailer hitch taken by line 3—3 on FIG. 1.

FIG. 4 is an enlarged detailed view of the carrier taken as indicated by line 4—4 on FIG. 2.

FIG. 5 is an enlarged detailed sectional view taken as indicated by line 5—5 on FIG. 2.

FIG. 6 is a perspective view of a typical trailer hitch member, FIGS. 7 and 8 are perspective views of the adapter and column member of the present invention.

PREFERRED EMBODIMENT

Referring now to the drawings, the vehicle is characterized by interior access through a rear door, hatch or trunk lid, shown herein as a rear window hatch 14 that swings upward on a tansverse horizontal axis d as indicated by arrow 15 in FIG. 2. A vertical longitudinally disposed clearance plane c occurs at each side of the vehicle and in substantial alignment outboard of the opposite side jambs 16 of said hatch. The rear vehicle opening defined by the window hatch 14 is the clearance area that is either occupied or vacated by this carrier.

The rearwardly opening socket member S is a usable feature of the vehicle that is available beneath the rear bumper 10 and which is characteristically a square tube member 17 as shown in FIG. 6, open to receive a plug 18 of the adapter A and having transversely disposed pin openings 19 to receive a bolt or pin 20 (see FIG. 2). It is common practice to releasably mount such an adapter in this manner, utilizing the socket and plug principle secured by a pin.

The adapter A is releasably installed on the socket member S by inserting the plug 18 therein and securing the pin 20 through an opening 21 therethrough. As shown, there are three sets of openings 21 through the tubular plug 18 (see FIG. 7). The adapter A extends rearwardly and horizontally from the socket member S a short distance approximately the same as state of the art ball hitch adapters, and at its rearmost terminal end it carries the trailer hitch ball B and is turned right angularly to extend laterally toward one side of the vehicle. It is the right side or curb side of the vehicle toward which this adapter arm 11 extends.

In accordance with this invention, the arm 11 of said adapter extends from the center of the vehicle to substantially one half the distance to the aforesaid clearance plane c. In most vehicles this is a distance of about one foot three inches to the pivot axis a (see FIG. 3). Accordingly, the axis a is vertically disposed and spaced rearward of the bumper 10 about one foot, or as may by required for a particular load clearance. A pivot pin 22 projects vertically from the top plane of arm 11 and on the axis a, to receive the arm 12 of shifting means D next described.

The shifting means D is provided to move the column C from a load carrying position to a hatch (door or lid) clearance position. The means D is shown in its preferred form as a gate-like swinging extension in the form of an arm 12 that sweeps from the center of the vehicle to the clearance plane c at one side of the vehicle (the right side for safety purposes). As shown throughout the drawings, the arm 12 is of substantially the same extent as arm 11, so as to coextensively overlie arm 11 when positioned as clearly shown in FIGS. 1 and 7, and to extend to and slightly beyond the clearance plane c as clearly shown in FIGS. 2

The arms 11 and 12 are of tubular cross section, the inner end of arm 12 having vertical openings 23 on axis a to rotatably drop over the pivot pin 22. Radially inward of pivot pin 22, the arm 11 is provided with a positioning pin 24 that projects a short distance from the upper plane of the arm to receive a complementary opening 25 in the bottom plane of arm 12, whereby the two arms are locked in alignment one with the other as shown in FIGS. 1 and 7. This locked condition is released simply by lifting the arm 12 a short distance, whereupon the arm 12 can be rotated to the clearance position of FIG. 2.

Referring now to FIG. 5, the gravitational positioning of arm 12 on arm 11 is enhanced by a spring 26 that yieldingly urges the two arms into the aforementioned locked engagement. As shown, the compression spring 26 is engaged over pivot pin 22 that carries a seat 27 opposing the top plane of arm 12, and between which said spring is compressed.

In accordance with this invention, the arm 12 of the shifting means D transports the column C between a central position over the hitch ball B as shown in FIG. 1 and a clearance position outside of the clearance plane c as shown in FIG. 2. Accordingly, a feature of the arm 12 is its support of the column C spaced above the ball B and beneath the lower jamb 32 of the hatch, door or lid 14 (see FIGS. 1 and 7). As shown, this spaced support is accomplished by a diagonal upturned portion 28 of arm 12 that extends radially upward from the pivot pin 22 on axis a. In practice the arm 12 turns upwardly at 45° from the top plane of arm 11, adjacent to the lock pin 24, and its terminal column supporting end spaced a distance above the ball B to accomodate a trailer hitch assembly (not shown) and any of its operational movements. A feature is that the joinder of the arm portion 28 to the upstanding column C is below and outboard of the joinder of the side jamb 16 with the lower jamb 32

The column C is a tubular member that is made integrally with the arm 12 and supported to extend vertically from the terminal end of the upturned portion 28 of the arm 12. The column C extends upward to a height sufficient to carry a bicycle (not shown) above the bumper 10, and as shown in FIG. 8 said column has a horizontally disposed top end face 29 from which a pivot pin 30 projects vertically on axis b to receive the header H. The column C is provided with a positioning pin 31 that is spaced radially from pivot pin 30 and projects a short distance from the top face 29 to receive one of a multiplicity of complementary openings in the header to position the same, in order to selectively condition and/or to releasably position said header. Pin 31 is positioned in alignment with the arm 12, as shown.

The header H is horizontal and carried on the pivot pin 30 and supported by the sop 29 of column C, so as to be movable to the positions of either FIG. 1 or FIG. 2. Accordingly, the header has angularly related central openings, either of which is rotatably engageable over the pivot pin 30. In practice, the header is made of square tubing, in which case opposite wall openings 32 and 33 are right angularly related for mounting the header on the pivot pin in one of two rotated positions.

Referring to the header H in the operating position shown in FIG. 1, the openings 32 shown in FIG. 4 are engaged over the pivot pin 30, whereby the rack members 13 project horizontally and rearwardly to carry a bicycle load or the like, when a complementary opening 34 engages over the positioning pin 31.

Referring now to the header H in its retracted clearance position as shown in FIG. 2, the openings 33 are engaged over the pivot pin 30, whereby the rack members 13 project vertically downward to carry a load of skis or the like, when a complementary opening 35 engages over the positioning pin 31.

The positioned engagement of header H on the top 29 of column C can be enhanced by the compression spring 26 as it is shown in FIG. 5 and described with respect to the arm 12 positioned on arm 11.

The rack members 13 can vary widely in design dependent upon the load to be carried, and they are offset from the column top face 29 by means of a dog-leg 36, so as to be spaced above said top in the FIG. 1 condition, and spaced rearward of the column C in the FIG. 2 condition. Attachment of the load to the rack members 13 is as may be required.

Having described only the typical preferred form and application of our invention, we do not wish to be limited or restricted to the specific details herein set forth, but wish to reserve to ourselves any modifications or variations that may appear to those skilled in the art as set forth within the limits of the following claims.

We claim:

1. A shiftable load carrier for transporting a load from a position obstructing a rear opening of a vehicle body to a clearance position at one side of the vehicle body, and including;

a member centered with and attached, to the vehicle body below a lower jamb of said rear opening, a horizontal adapter extending from said member and projecting rearwardly and laterally toward said one side of the vehicle body and with a terminal end portion at substantially one half of a distance to a clearance plane at a side jamb of the rear opening at said one side of the vehicle body, a vertically disposed column carried by a shifting means having an arm for transporting the column from said position obstructing the rear of the vehicle body to a clearance position outside said clearance plane, there being a pivot carried by a top end face of the column, and a header on the column and with means for carrying and transporting a load therewith and between said obstructing position and said clearance position, the header being horizontally disposed and rotatable on said pivot to swing away from the vehicle body when in said clearance position at the one side.

2. A shiftable load carrier for transporting a load from a position obstructing a rear opening of a vehicle body to a clearance position rearward of the vehicle body, and including;

a member centered with and attached to the vehicle body below a lower jamb of said rear opening, a horiztontal adapter extending from said member and projecting rearwardly of the vehicle body and with a terminal end portion substantially one half of a distance to a clearance plane at the rear of the vehicle body, a vertically disposed column carried by a shifting means having an arm for transporting the column from said position obstructing the rear of the vehicle body to a clearance position outside said clearance plane, there being a pivot carried by a top end face of the column, and a horizontally disposed header on the column and rotatable on said pivot to swing away from the vehicle body when moving to and from said clearance position and with means for carrying and transporting a load between the obstructing position and the clearance position, the pivot being a pin projecting from said top end face of the column for support of the header rotatably engaged thereon, there being a positioning pin spaced radially from said pivot pin releasably engaging the column end face and header at the top end face and from which said header is lifted for rotation, the header being slidable on said pivot pin.

3. The shiftable load carrier as set forth in claim 2, wherein a second pivot is carried by the terminal end portion of the adapter, the column being carried by the shifting means arm rotatable on said second pivot to swing between said position obstructing the rear opening of the vehicle body and said clearance position rearward of the vehicle body.

4. The shiftable load carrier as set forth in claim 2, wherein a spring is carried on the pivot pin between seats on said pin and on the header and yieldingly depresses said header into releasable support on the top end face of the column.

5. A shiftable load carrier and trailer hitch for simultaneous hitch operation and load transport from a position obstructing a rear opening of a vehicle body to a clearance position at one side of the vehicle body, and including;

a member centered with and attached to the vehicle body below a lower jamb of said rear opening, a horizontal adapter extending from said member and projecting rearwardly and with a hitch ball carried at the rearmost portion thereof and at a level substantially below said lower jamb of the rear opening, and extending laterally toward said one side of the vehicle body and with a terminal end portion at substantially one half of a distance to a clearance plane at a side jamb of the rear opening at said one side of the vehicle body, a vertically disposed column carried in spaced relation over the hitch ball by a shifting means having an arm for transporting the column from said position obstructing the rear of the vehicle body to a clearance position outside said clearance plane, and a header on the column and with means for carrying and transporting a load therewith and between said obstructing position and said clearance position.

6. The shiftable load carrier and trailer hitch as set forth in claim 5, wherein the member is a rearwardly opening socket member and the adapter and hitch ball are therefrom by means of a socket and plug connection and securement means therefor.

7. The shiftable load carrier and trailer hitch as set forth in claim 5, wherein a pivot is carried by the terminal end portion of the adapter, the column being carried by the shifting means arm rotatable on said pivot to swing between said position obstructing the rear opening of the vehicle body and said clearance position at said one side of the vehicle body.

8. The shiftable load carrier and trailer hitch as set forth in claim 7, wherein the pivot is a pin projecting from a top plane of the laterally extending adapter for support of the shifting means arm rotatably engaged thereon, the arm extends radially and upwardly therefrom to a position of column support below said lower jamb of the rear opening and spaced above the hitch ball when the shifting means is in said position obstructing the rear of the vehicle body.

9. The shiftable load carrier and trailer hitch as set forth in claim 5 wherein a pivot is carried by the terminal end portion of the adapter, the column being carried by the shifting means arm rotatable on said pivot to swing between said position obstructing the rear opening of the vehicle body and said clearance position at said on side of the vehicle body, and wherein a positioning pin spaced radially from said pivot pin releasably engages the adapter and shifting means arm, whereby said arm is lifted for rotation, the shifting means arm being slidable on said pivot pin.

10. The shiftable load carrier and trailer hitch as set forth in claim 9, wherein a spring carried over the pivot pin between a seat on said pin and the shifting means arm yieldingly depresses said arm into releasable engagement on the adapter.

11. The shiftable load carrier and trailer hitch as set forth in claim 5, wherein a pivot is carried by a top end face of the column, the header being horizontally disposed and rotatable on said pivot to swing away from the vehicle body when in said clearance position at the one side.

12. The shiftable load carrier and trailer hitch as set forth in claim 11, wherein the pivot is a pin projecting from said top end face of the column for support of the header rotatably engaged thereon, and wherein a positioning pin spaced radially from said pivot pin releasably engages the top end face of the column and the header, whereby said header is lifted for rotation, the header being slidable on said pivot.

13. The shiftable load carrier and trailer hitch as set forth in claim 12, wherein a spring is carried on the pivot pin between a seat on said pin and a seat on the header, yieldingly depressing said header into releasable support on the top end face of the column.

* * * * *